United States Patent [19]
Gallagher et al.

[11] Patent Number: 5,396,636
[45] Date of Patent: Mar. 7, 1995

[54] REMOTE POWER CONTROL VIA DATA LINK

[75] Inventors: Robert J. Gallagher, Hurley; Karl H. Hoppe, Ulster Park; Anthony J. Perri, Staatsburg; Mark S. Styduhar, Germantown; Jordan M. Taylor, Poughkeepsie; Bert W. Weidle, Ulster Park, all of N.Y.

[73] Assignee: International Business Machines Corporation, Armonk, N.Y.

[21] Appl. No.: 779,690

[22] Filed: Oct. 21, 1991

[51] Int. Cl.6 .............................................. G06F 11/00
[52] U.S. Cl. .................. 395/750; 364/DIG. 1; 364/273; 364/273.1; 364/273.2
[58] Field of Search ................ 395/750, 575, 375, 200; 371/66; 364/707

[56] References Cited

U.S. PATENT DOCUMENTS

| | | | |
|---|---|---|---|
| 3,908,086 | 9/1975 | Marino et al. | 179/2 DP |
| 4,203,153 | 5/1980 | Boyd | 395/750 |
| 4,367,414 | 1/1983 | Miller et al. | 307/38 |
| 4,562,550 | 12/1985 | Beatty et al. | 364/492 |
| 4,611,131 | 9/1986 | Shah | 307/449 |
| 4,695,946 | 9/1987 | Andreasen et al. | 395/575 |
| 4,698,748 | 10/1987 | Juzswik et al. | 395/750 |
| 4,747,041 | 5/1988 | Engel et al. | 395/750 |
| 4,901,307 | 2/1990 | Gilhousen et al. | 370/18 |
| 4,907,150 | 3/1990 | Arroyo et al. | 395/750 |
| 5,034,966 | 7/1991 | Hochstein | 375/40 |
| 5,167,024 | 11/1992 | Smith et al. | 395/375 |
| 5,182,810 | 1/1993 | Bartling et al. | 395/750 |
| 5,203,003 | 4/1993 | Donner | 395/800 |
| 5,218,607 | 6/1993 | Saito et al. | 371/66 |
| 5,239,652 | 8/1993 | Seibert et al. | 395/750 |

OTHER PUBLICATIONS

Remote Power Control System, IBM Technical Disclosure Bulletin, vol. 29, No. 12, pp. 5536–5537, May, 1987.

Primary Examiner—Jack B. Harvey
Assistant Examiner—Ayaz R. Sheikh
Attorney, Agent, or Firm—Lawrence D. Cutter

[57] ABSTRACT

An inexpensive and low power consumption power control unit that does not require a separate interface or network. In the power off state only a detector and a power controller require power, this power is supplied from a power source. Upon detection of traffic a frame decoder is powered up to receive frames. When the link is quiet, the decoder is powered down while the power controller and receiver remain powered and await further traffic.

11 Claims, 4 Drawing Sheets

REMOTE POWER CONTROL VIA DATA LINK

BACKGROUND OF THE INVENTION

1. Field of the Invention

This invention relates generally to the field of remote power control systems, and more particularly to using a data communications link for power control.

2. Description of the Related Art

Many computer systems and peripheral equipment are located out of reach of service personnel, such as at unmanned locations. Even when they are within reach it is often desirable to have computer systems maintain power control over themselves and their peripherals; this makes operations even more energy efficient and avoids operator error in power down situations.

Once all power is physically removed from any unit, the unit is unable to perform any functions and therefore cannot return to a powered state unless the flow of power is restored by another unit.

Lap-top computers often selectively reduce their own power consumption based upon user needs. For instance, a lap-top computer may place the screen in a low power or no power state if the computer is not in use. Hard disk drives are often treated similarly. When the microprocessor, by some predetermined event, determines that power needs to be restored, the flow of power is returned to the unit. Components are often driven into various power states by such a power controller. Many video cassette recorders (VCRs), when turned off, are actually in a low power state, ready to power up and begin recording at the instance of some event, usually a prespecified time or the touch of the power button on the units remote control. The controlling device remains in the power on state and monitors for any such event. Large electronic systems with greater power consumption needs can also take advantage of the energy efficiency and the reduction in operator error of a power control system.

In a computer system, in order for one unit to have power control over another, there must also be a relationship between them such that the controller (master) will not remove power from a controlled (slave) until the slave is in a state ready to be powered down. If a single slave unit is controlled by multiple masters, there will have to be some mechanism for preventing the slave from having power removed while serving another master.

To accomplish this, a hardware protocol can be implemented through the use of a dedicated power control interface; when any master needs the services of a slave it simply supplies power to a particular line in the interface. When the master is no longer in need of the slave it simply stops asserting that power. All masters use a common interface line for this action, therefore, when that line is without power the slave is powered off because no master requires its services.

Data communications equipment may be used to control power to host equipment. To do this a transceiver with a built in frame decoder may be left powered on, the host remains in a power off state until a properly addressed power-up frame is received. Once such a frame is received the host is supplied with power until a properly addressed power-down frame is detected.

A different method for preventing a slave from having power removed while serving another master is through the use of a protocol that builds power allegiances between the slave and each master being serviced. A power allegiance is built by a master sending a power-on frame to an intelligent frame decoder. In response, the frame decoder supplies power to the requested device. If another power-on frame is received from different source another power allegiance is built without the need to change the supply of power to the device. When a power-off frame is received, the corresponding power allegiance is broken. If, upon receipt of a power-off frame and the breaking of that power allegiance, there are no other power allegiances for that device, the supply of power to that device is terminated.

SUMMARY OF THE INVENTION

In practicing the instant invention, a remote power controller is formed for connecting a communications link to a host system, comprising a frame decoder and a means responsive to the presence of a signal on said communications link. Said frame decoder will detect said power-on and power-off frames, in response to said frames the frame decoder enables and disables said host equipment. Said means responsive to the presence of a signal, in response to the presence of a signal, enables said frame decoder.

Said means responsive to the presence of a signal is powered from a separate power source from said host equipment and said frame decoder. This separate power source may be a battery, and said battery may be recharged from the power source which powers the host system.

The foregoing and other features and advantages of the invention will be more readily understood upon consideration of the following detailed description of the invention, taken in conjunction with the accompanying drawings.

DETAILED DESCRIPTION OF THE INVENTION

Figure 1:
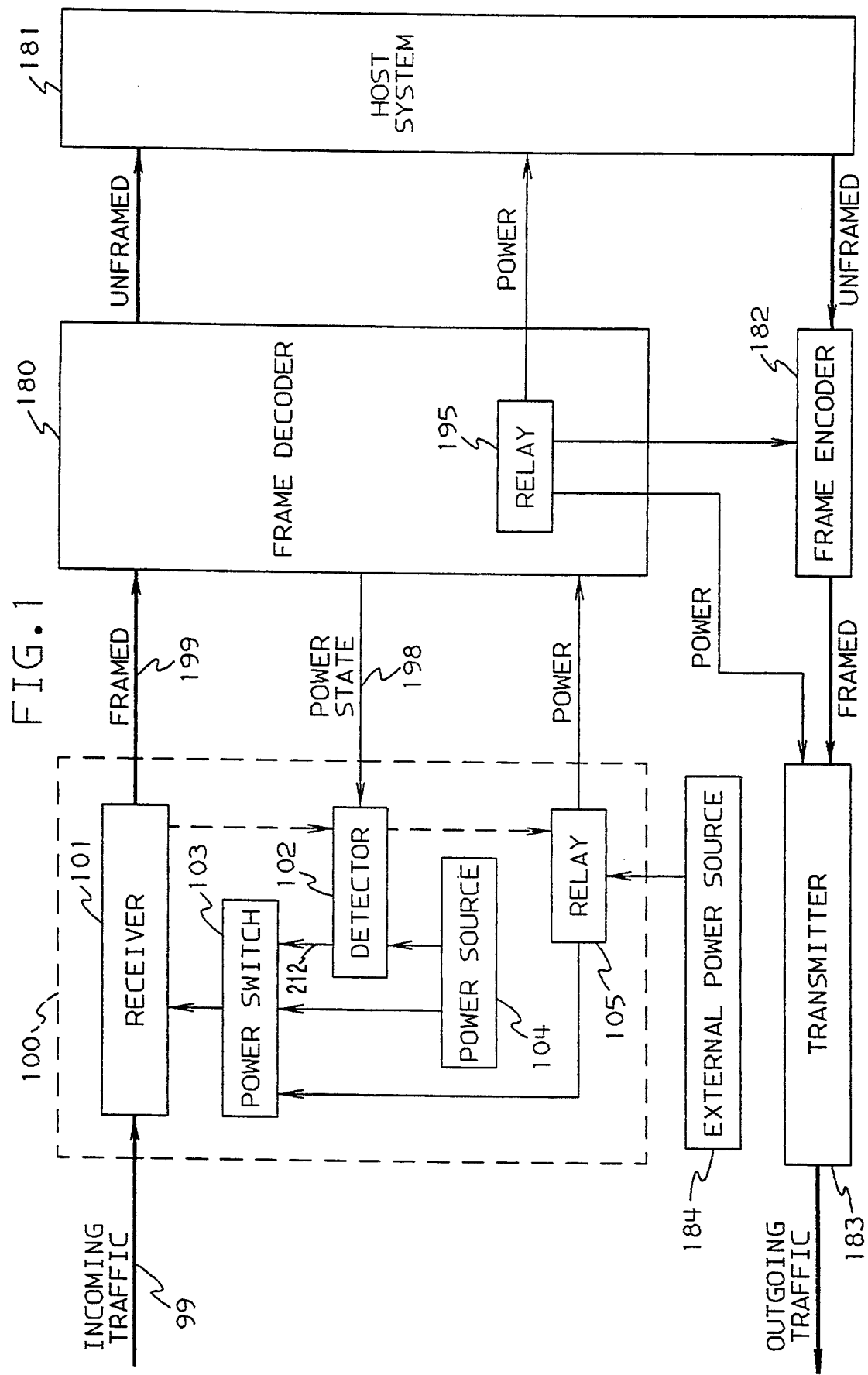
FIG. 1 illustrates the remote power controller in accordance with the invention.

FIG. 1 schematically illustrates a remote power controller 100 connected to a frame decoder 180 and an external power source 184 as well as other equipment that would make up one end or node of a data communications link. This other equipment would include a transmitter 183 and a frame encoder 182, as well as a host system 181.

A data communication link 99 is connected to a receiver 101, which may be of any type to receive a communications signal. The receiver 101 converts the information on the data communication link to a logic signal suitable for use by local equipment, such as frame decoder 180, and passes that converted signal to the local equipment over a local line 199.

A detector 102 receives a signal from receiver 101 whenever traffic is detected on the link 99. Upon receiving this signal, the detector 102 activates a control lead to a power switch 103 and engages (closes) a relay 105 to provide a power flow from external power source 184 to both frame decoder 180 and power switch 103. Detector 102 can be a logic circuit or a microprocessor configured to implement the desired reactions to input stimuli. The relay 105, when engaged, can supply power from the external power source 184 to other devices in addition to the frame decoder 180 and the power switch 103.

An isolated power source 104 provides power to the remote power controller 100. This can be a self-contained power source such as a battery, or an external source separate from external power source 184.

In the preferred embodiment, power switch 103 (see also FIG. 2) directs a flow of power to the receiver 101 from power source 104. When power is supplied to the switch 103 from the external power source 184 through the relay 105, the receiver 101 is supplied with power from that external source 184 instead of from the power source 104. If the power source 104 is a rechargeable battery, it may be recharged from the external power source 184 during the periods that the relay 105 permits the flow of power to the frame decoder 180 and the power switch 103.

Frame decoder 180 controls relay 195 discussed below. Relay 195 is engaged (closed) in response to receiving a power-on frame over communications link 99. When engaged, relay 195 supplies power to host system 181, the frame encoder 182 and the transmitter 183. Alternatively, relay 105 may provide power directly (not shown) to frame encoder 182 and transmitter 183 as well as other devices. This configuration is particularly desirable if the power-on sequence for the frame decoder 180 required a bidirectional exchange.

The power state line 198 (discussed in further detail below) is used by frame decoder 180 to indicate to detector 102 that frame decoder 180 no longer requires power. In response, detector 102 may disengage relay 105, thereby cutting off the supply of power to the frame decoder 180.

Figure 2:
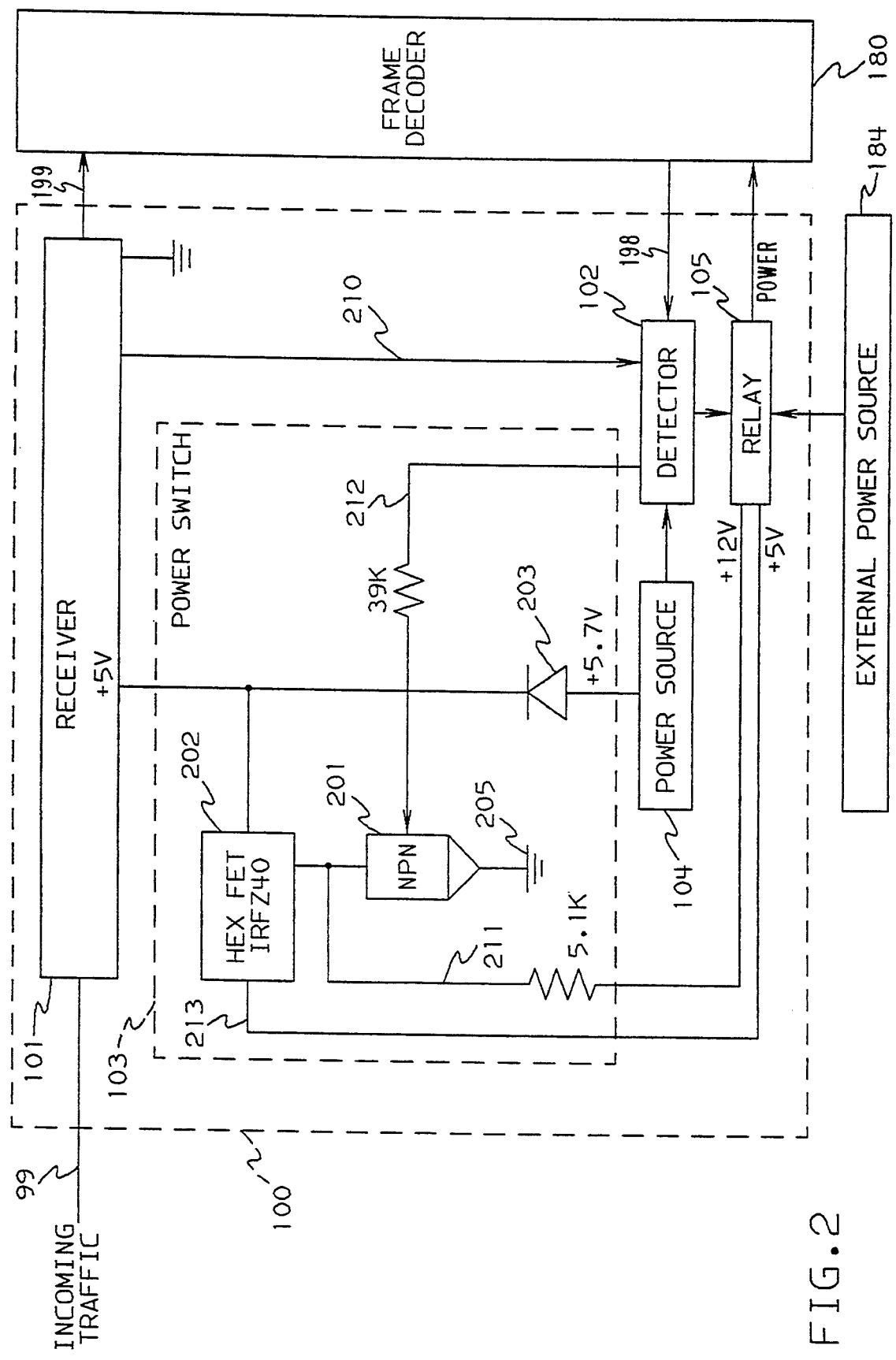
FIG. 2 illustrates a remote power controller in accordance with the invention and includes a detail of the power switching apparatus.
Figure 4:
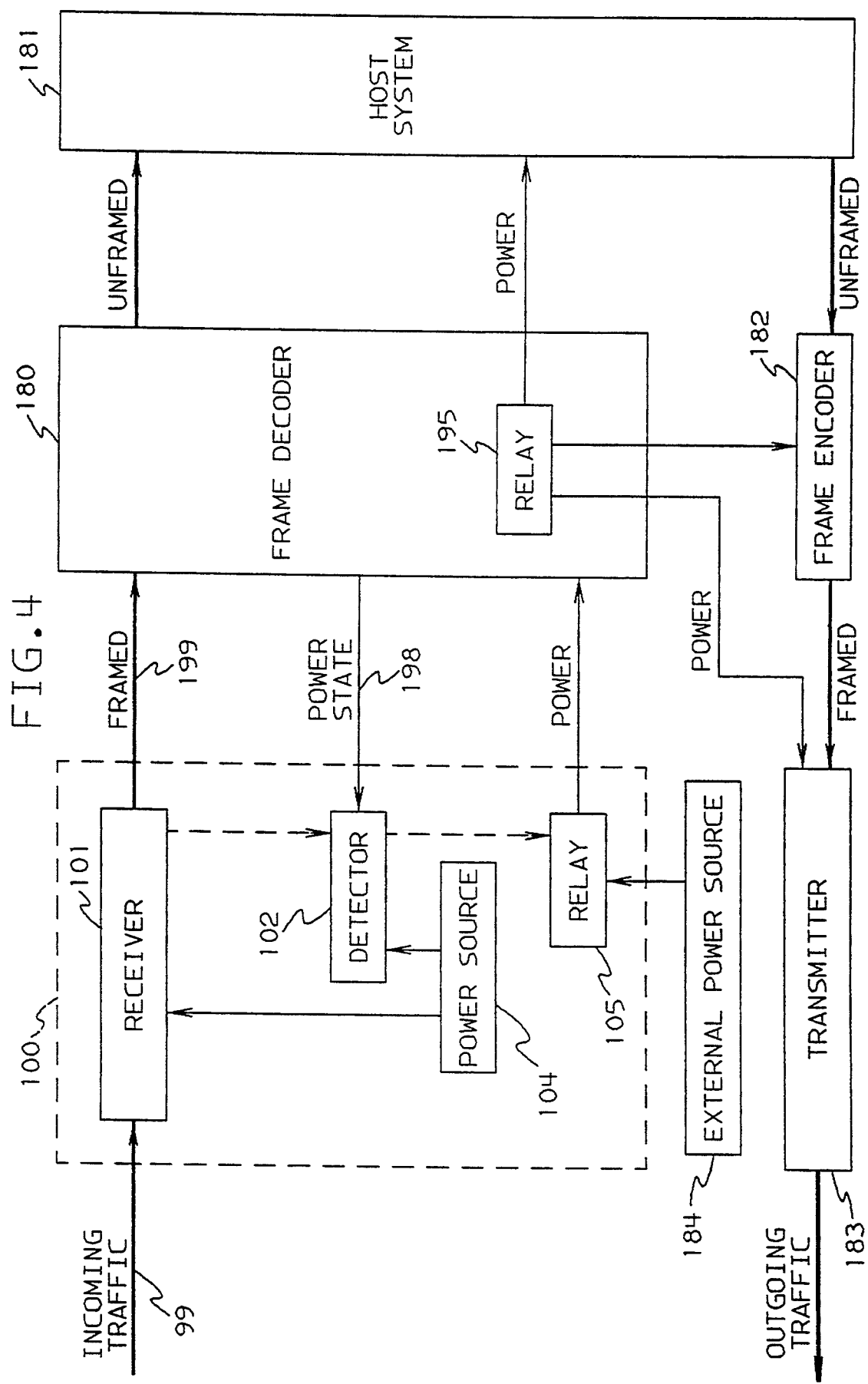
FIG. 4 illustrates another remote power controller in accordance with the invention.

FIG. 2 illustrates a remote power controller 100 in accordance with the invention and includes a detail of the power switch 103. As illustrated by FIG. 4 the power switch 103 is not a necessary component of the invention. In the preferred embodiment, however, the power switch 103 is used to control the source of power to the receiver 101. It is often desirable and efficient for the transmission of data from the receiver 101 to the frame decoder 180 to have both powered from a common source.

When relay 105 is open (no current passes through) and the frame decoder 180 is therefore in the unpowered state, the detector 102 maintains assertion on the line 212. While the line 212 is asserted, receiver 101 is powered from power source 104 because the assertion of the line 212 causes an NPN transistor 201 to connect the line 211 to ground 205; the resulting zero voltage on line 211 to the HexFet 202 will prevent the flow of current from the +5 volt line 213 to the receiver 101.

The detector 102 receives a signal from the receiver 101 over line 210 indicating the existence of incoming traffic over communications link 99. This signal may differ depending on the medium of the link 99. If the medium of the link 99 is fiber optic, the signal may come from a loss-of-light (LOL) output on the receiver; many fiber optic receivers have an LOL signal available. The signal over the line 210 may, however, be any signal that will indicate the presence or absence of incoming traffic over link 99.

Detector 102 determines that conditions are met to power on the frame decoder 180. In order to power on the frame decoder 180, detector 102 engages (closes) relay 105, thus powering the frame decoder 180 from external power source 184. The power switch 103 also receives power from relay 105. To place both the frame decoder and the receiver on a common power source, the detector 102 deasserts the line 212 concurrently with the engaging (closing) of relay 105.

The detector 102 stops asserting the line 212 thereby causing transistor 201 to open and no longer make ground contact 205 with the line 211. As a result, the voltage in the line 211 will increase sufficiently to cause HexFet 202 to close and the line 213 will be in electrical contact with, and supplying power to, the receiver 101.

Power source 104 supplies about +5.7 volts. As a result of the threshold drop of diode 203, the receiver 101 side of diode 203 measures a voltage of only about +5 volts, a drop in voltage of 0.7 volts.

The detector 102, by asserting the line 212 can reinstate power source 104 as the source of power to the receiver 101.

Figure 3:
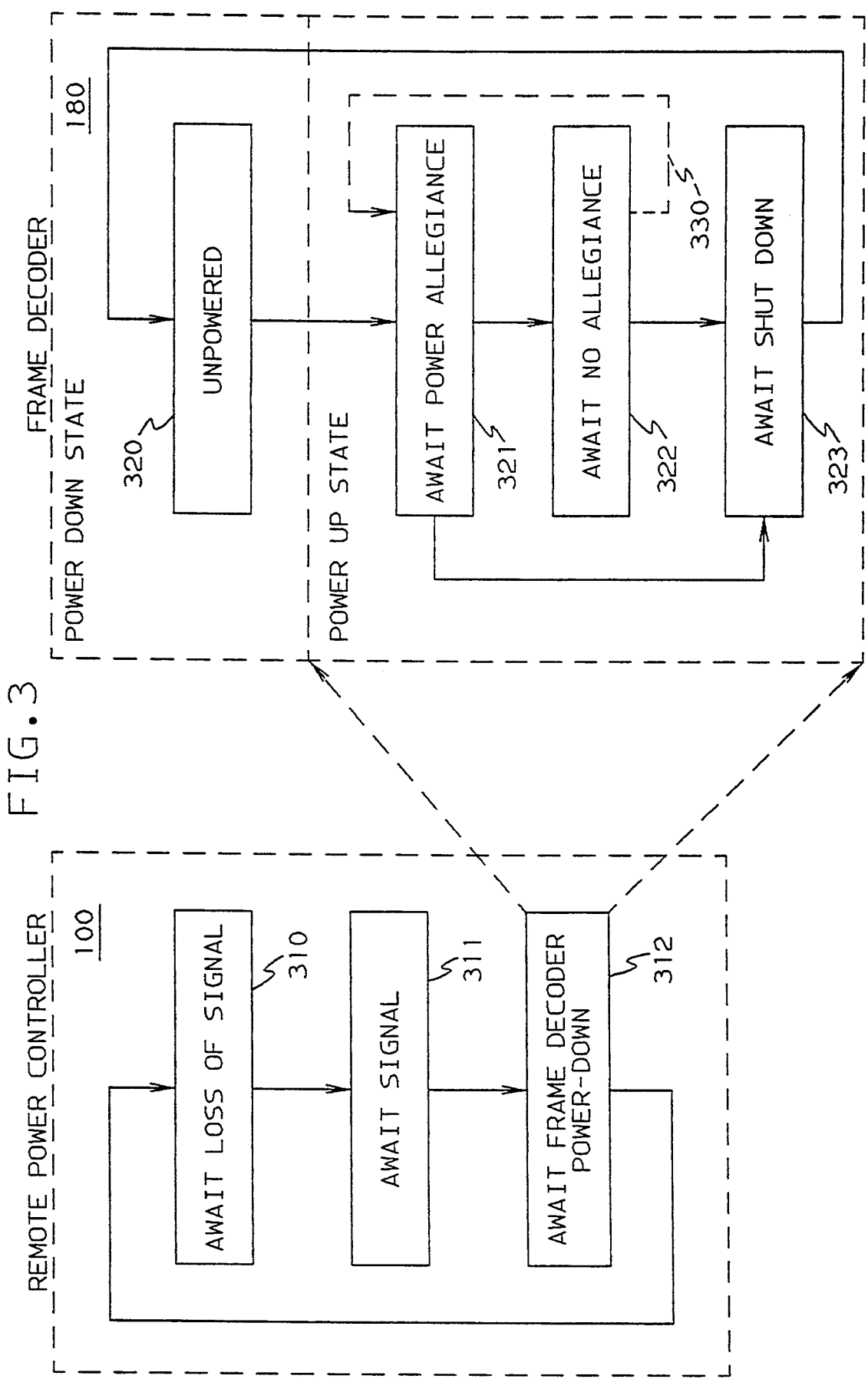
FIG. 3 is a state diagram representing the various states of the invention and a frame decoder.

FIG. 3 is a state diagram representing the relationship between the remote power controller 100 and the frame decoder 180. The remote power controller 100 begins in a state awaiting the absence of signal on the incoming communications link 99 (FIG. 1), called Await Loss of Signal 310. The link 99 (FIG. 1) is monitored until it is quiescent for a specified period of time. On a fiber optic link, this would usually be approximately three (3) seconds of no light, but the actual time would be determined based upon the communications speed and the signal to noise ratio in that communications environment. When Loss of Signal is detected, a transition to the state Await Signal 311 is made.

Await Signal 311 monitors the link 99 (FIG. 1) for signal activity. In a communications environment, often noise is detected as a signal, therefore, the Await Signal State 311 does not simply react to the presence of any signal activity but only to a specified continuous period of signal activity. When signal activity occurs for the specified period of time, the remote power controller transitions to the state Await Frame Decoder Power-down 312, and power is supplied to the frame decoder 180. On a fiber optic link, the specified period of time over which signal activity would occur to transition from the Await Signal 311 state to the Await Frame Decoder Power-down state 312 would usually be approximately three (3) seconds of light, but the actual time would be determined based on the communications speed and the signal to noise ratio in that communications environment.

The Await Frame Decoder Power-down state 312 is entered concurrently with the supplying of power to the frame decoder 180. This state can be terminated by the frame decoder deasserting Power State 198 (FIG. 1) when power is no longer required. Once Power State 198 (FIG. 1) is deasserted, the remote power controller transitions back to the Await Loss of Signal state 310, and concurrently, the supply of power to the frame decoder 180 is terminated.

The frame decoder 180 originates in the Unpowered state 320. The supply of power from the remote power controller 100 transitions the frame decoder 180 into the Await Power Allegiance state 321. Entry into the Await Power Allegiance state 321 will assert the Power State 198 (FIG. 1) if it is not already asserted.

In the preferred embodiment, the Await Allegiance state 321 will decode incoming frames over the communications link 99 (FIG. 1) and wait for a power-up frame or another similar frame attempting to build a power allegiance. Upon receiving such a frame, the frame decoder supplies its host equipment 181 (FIG. 1) and the encoder/transmitter 182, 183 (FIG. 1) with power from an external power source 184 (FIG. 1) via a relay 195 (FIG. 1) and transitions into the Await No Allegiance state 322. If no power-up or similar frame is received within a specified period of time, the frame decoder transitions to the Await Shut Down state 323. A typical time to await a power-on frame would be approximately thirty (30) minutes, the actual amount of time, however, would depend on the communications rate and the signal to noise ratio in the communications environment.

In the Await No Allegiance state 322, the frame decoder 180 pursues its normal course, decoding frames for its host 181 (FIG. 1) equipment. If further power-up frames are received additional allegiances may be built. Once all allegiances have been terminated by power-down frames or other means a transition to the Await Shut Down state 323 occurs. It may, however, be desirable to transition according to the path 330, and have the Await No Allegiance state 322 transition to the Await Power Allegiance state 321; this causes the frame decoder 180 to continue waiting for power-on frames for a specified time.

The Await Shut Down state 323 is a transient state, it deasserts the Power State 198 (FIG. 1) to the remote power controller 100, which, upon recognizing this deassertion will terminate the supply of power to the frame decoder 180. This will place the frame decoder 180 in the unpowered state 320.

FIG. 4 schematically illustrates a remote power controller 100 connected to a frame decoder 180 and an external power source 184 as well as other equipment that would make up one end or node of a data communications link. This other equipment may include a transmitter 183 and a frame encoder 182, and a host system 181.

FIG. 4 differs from FIG. 1 only in that there is no power switch 103 (FIG. 1) providing power from the external power source 184. It is often convenient, to facilitate the movement of data from the receiver 101 to the frame decoder 180, to have both powered from a single power source, but this is not a requirement of the invention.

Thus it can be seen that a new improved remote power controller that requires no separate interface or control lines to control power and provides very low power consumption has been provided by the present invention. The disclosed remote power controller is easily used with existing communications equipment to further reduce the power consumption and to reduce errors due to operator power control.

It will be understood that the invention may be embodied in other specific forms without departing from the spirit to central characteristics thereof. The instant examples and embodiments, therefore, are to be considered in all respects as illustrative and not restrictive, and the invention is not to be limited to the details given herein.

What is claimed is:

1. An apparatus connecting a communication link and a host system for controlling the application of power to said host system, said apparatus comprising:

frame decoder means for decoding power control frames to power up said host system;

power controller means for converting power control information on said communication link into power control frames suitable for use by said frame decoder; and first power source means;

said power controller means including means for receiving said power control information;

power switch means for controlling the source of power to said receiving means;

detector means connected to said receiving means;

first control means connected to said detector means for controlling the application of power from said first power source means to said power switch means and to said frame decoder means; and second power source means for applying power to said power switch means and said detector when no information is present on said communication link;

said detector means being capable of receiving a signal from said receiving means whenever power control information is detected on said communication link for controlling said first control means to apply power from said first power source means to activate said power switch means to apply power to said receiving means and to apply power from said first power source means to activate said frame decoder means.

2. The apparatus of claim 1 wherein said first power source means is an external power source.

3. The apparatus of claim 1 wherein said second power source means is a rechargeable battery.

4. The apparatus of claim 3 wherein said battery is recharged from said first power source means when said first control means permits power to be applied to said power switch means and said frame decoder means.

5. The apparatus of claim 1 wherein said first control means is a relay means activated by said detector means when power control information is detected on said communication link.

6. The apparatus of claim 1 wherein said frame decoder means includes a second control means activated when said frame decoder means decodes a power control frame for applying power to said host system.

7. The apparatus of claim 6 wherein said second control means is a relay means.

8. The apparatus of claim 1 wherein said frame decoder means includes means for applying a signal to said power controller means when said frame decoder means no longer requires power.

9. The apparatus of claim 8 wherein said power controller means responds to said signal from said frame decoder means to cause said frame decoder means to be disabled.

10. The apparatus of claim 9 wherein said detector means of said power controller means responds to said signal from said frame decoder means to control said first control means to inhibit applying power to said frame decoder means.

11. An apparatus connecting a communication link and a host system for controlling the application of power to said host system, said apparatus comprising:

frame decoder means for decoding power control frames to power up said host system;

power controller means for converting power control information on said communication link into power control frames suitable for use by said frame decoder means; and first power source means;

said power controller means including means for receiving said power control information;

detector means connected to said receiving means;

first control means connected to said detector means for controlling the application of power from said first power source means to said frame decoder means; and second power source means for applying power to said receiving means and said detector;

said detector means being capable of receiving a signal from said receiving means whenever power control information is detected on said communication link for controlling said first control means to apply power from said first power source means to activate said frame decoder means.

* * * * *